United States Patent [19]
Weldon

[11] Patent Number: 6,131,925
[45] Date of Patent: Oct. 17, 2000

[54] BEACH BUDDY

[76] Inventor: Paul Weldon, 880 Sunset Hollow Rd., West Chester, Pa. 19380

[21] Appl. No.: 08/884,195

[22] Filed: Jun. 30, 1997

[51] Int. Cl.[7] ...................................................... B62B 1/04
[52] U.S. Cl. ..................... 280/30; 280/47.18; 280/47.25; 280/47.26; 280/650
[58] Field of Search .............................. 224/414; 280/30, 280/47.18, 47.19, 47.24, 47.26, 47.25, 652, 655, 651, 650, 654; 297/31, 59, 60, 421, 457

[56] References Cited

U.S. PATENT DOCUMENTS

| | | | |
|---|---|---|---|
| 4,323,260 | 4/1982 | Suchy | 280/47.25 |
| 4,703,944 | 11/1987 | Higson | 280/30 |
| 4,887,837 | 12/1989 | Bonewicz, Jr. et al. | 280/654 |
| 5,100,198 | 3/1992 | Baltzell | 280/30 |
| 5,104,016 | 4/1992 | Runkel | 224/414 |
| 5,464,183 | 11/1995 | McConnell et al. | 224/414 |
| 5,480,170 | 1/1996 | Kaiser, II | 280/30 |

*Primary Examiner*—Richard M. Camby
*Attorney, Agent, or Firm*—Laurence A. Weinberger

[57] ABSTRACT

A beach buddy cart provides an easy means to transport items held on the cart platform to a sandy beach location. The beach buddy is provided with a contoured back and foldable seat so that it can serve as a beach chair once at the beach. In addition, retaining rings provide for the secure carrying of a beach umbrella. The carrying platform is supported at both ends when not being moved and is further supported by straps during transit. A pressurized sprayer mounted on the side of the cart back allows fresh water to be easily transported to the beach, warmed, and used to remove salt water and sand both from people and accessories.

18 Claims, 4 Drawing Sheets

BEACH BUDDY

BACKGROUND OF THE INVENTION

1. Field of the Invention

This invention relates generally to foldable carts or caddies which are designed to help transport to a beach those items typically required for beach recreation, and more specifically to a cart which aids not only in the transportation but one which may also be used as a chair or table at the beach and which, in addition, is specially adapted for the transportation of two major beach items, an umbrella and a pressurized water wash.

2. Description of the Prior Art

The art of some form of cart or caddie with which to carry recreational items to the beach, which cart or caddie may then be used in some manner at the beach, is not new but, rather, is an art crowded with ideas and designs encompassing many of the same ideas. However, it is apparent from a casual observation on any warm day at any beach that the prior art devices are not present and have obviously failed to achieve acceptance. In fact, chairs, blankets, umbrellas, coolers, tote bags, radios, playpens, boggy boards, etc. are still awkwardly carried and dragged to the beach. A few of the more relevant prior art inventions designed to solve this problem are described below.

In U.S. Pat. No. 5,269,157, Ciminelli describes an insulated beach box which is adapted to be wheeled or slid over terrain to reach a desired beach location. The beach box has a pivotally connected back which may be used as a handle when moving the box and as a seat back when sitting upon the box. The back includes a flexible member with pockets for storing personal items. While Ciminelli suggests that there is a need for a device to facilitate carrying utilitarian items to and from the beach, his invention provides for an insulated box and a seat/chair only. Ciminelli suggests that a beach umbrella may be stuck into the sand and clamped to the seat back to shade the seat's occupant. However, Ciminelli does not mention how the umbrella is carried to the beach and no provision for attachment to the beach box is described. During transit, Ciminelli suggests that miscellaneous beach items which can fit between the back and top of the beach box may be held on with a flexible strap.

Carlile, in U.S. Pat. No. 4,865,346, describes a collapsible cart, held together by the frictional engagement of its components and quickly disassembled, which may be used to carry articles to the beach. The cart has a pivotally attached bottom shelf, which may be locked into position with a set of folding braces, for carrying a cooler chest. The cart is supported in an upright position by a rest attached to the edge of the shelf when the shelf is in its locked position. A picnic basket with folding shelf is attached to the cart above the cooler chest. Carlile provides for a single umbrella holder on one of the cart's side arms and beverage holders on the other side arm. Additional bracket arms support one or more folding chairs. On the rear of the cart, a auxiliary storage bag is removably attached.

A beach caddie is described by Higson in U.S. Pat. No. 4,703,944 which incorporates a chair rack and platform assembly, and, when used in a horizontal position at the beach, provides a beach table. Although marginally described, the beach caddie apparently provides for the transportation of an umbrella and fishing poles as well as for their storage once at the beach. A topmost hinged section attached to the vertical members may be rotated at a right angle to the vertical members so that shafts of umbrellas and fishing poles may be placed through orifices therein. Such shafts rest upon the "upper cross-member 6" of the caddie although it is not clear whether the shafts engage the holes in the cross-member. It is also not clear what keeps the topmost hinged section from working against and flexing the fishing poles and/or umbrella shaft. The table surface of the caddie has orifices sized to hold umbrella and fishing pole shafts (presumably in an upright position for use) and orifices to hold drinks. Hook and loop fasteners secure the movable members when the caddie is used as a table at the beach.

Bonewicz, in U.S. Pat. No. 4,887,837, describes a carrier for transporting objects to the beach. Bonewicz describes a relatively straight-forward hand cart having a platform which either folds up parallel to the main frame or rotates perpendicularly to form a carrying surface. The platform has locking braces on its underside which engage the side rails to support the weight of the items being transported. In one embodiment the cart has a "cup-like" member located near the lower end of a side frame and a hook-like clasping member mounted higher on the same side frame. An umbrella may be attached with its top end in the cup-like receptacle and the hook-like element encircling its lower end. It is not clear what happens when the umbrella diameter exceeds the size of the hook-like member. The cart is further provided with a picnic basket or bag which may be mounted between the two frame members to carry additional articles. In a preferred embodiment, a hollow bag may be slipped over the upright frame and held by a strap to the handle. In this embodiment, the hook-like member and the cup-like member are not used and an umbrella can not be carried on the cart. Like Ciminelli an elastic cord may be stretch between the upright frame and the platform to restrain items placed on the platform.

While these devices of the prior art address some of the needs of a typical beach goer, it is clear that not one of the devices address all the problems which are solved by the beach buddy of the present invention and, in particular, perhaps the most frequently encountered problem of beach activity is not met. Specifically, either at the beach or upon leaving the beach, everyone is ultimately faced with the problem of removing either wet or dry sand from their bodies and especially from their feet before being able to put on a pair of shoes or sandals. This is particularly troublesome if the person needs to walk a long distance or is going to be driving a car. For those persons returning from an ocean beach, the problems is compounded by the residual stickiness from the salt water. Another problem with devices of the prior art is that many of them, such as that of Bonewicz, do not perform a useable function once at the beach, and essentially amount to another useless article which one must be careful not to trip over. These and other deficiencies in prior art devices are overcome with the beach buddy of this invention.

SUMMARY OF THE INVENTION

The beach buddy of this invention is specially adapted to conveniently provide several useful features desired by anyone going to a beach. For instance, the beach buddy may be used as a chair once it is unloaded at the beach and for this purpose incorporates a contoured seat back and chair seat for added comfort. In addition, ventilation holes or slots are provided in the back and seat to provide for both water drainage and air flow to improve comfort. On one side of the upright back, circular holding rings of graduated size are provided for holding beach umbrellas of different sizes without risk of the umbrella unhooking and falling off the beach buddy during transport to the beach. An umbrella stop is also provided so that the lower end (top) of the umbrella is also restrained. On the opposite side of the back, a pressurizable water container is provided. Water from this container may be used as cooling water over sunbathers and sprayed to remove sand and other debris which may cling to the body and feet. A seat/platform is rotatably mounted to the upright back so that in the seat/platform's storage position, it lies parallel to the back. In its working position, the seat/platform rotates so that it rests at a right angle to and is supported by the frame. Restraining straps connecting the back to either side of the seat/platform support the weight of items placed on the platform during the journey to the beach.

The seat/platform is additionally supported at its front end by a rotatable U-shaped brace which can be extended beneath the seat/platform once the desired spot on the beach has been attained. As noted above, the seat/platform is curved to provide a contoured seat for a person to sit upon. Ventilation and drainage holes or slots are provided in the seat and, in addition, holes sized to receive drinking containers are also provided in the seat/platform.

In use, the seat/platform is rotated from its storage position so that it rests at a substantially right angle to the back. Items to be transported to the beach are placed on the seat/platform and secured. The beach buddy may then be rolled to a desired location at the beach. A vented utility bag may be removably attached to the rear side of the back. Wide wheels spread the weight of the beach buddy over a broad surface so that it does not sink into soft sand.

It is an object of this invention to provide a beach cart which is not only useful for hauling items typically desired for a beach outing, but which also provides a means of cleansing the sand off the beach goers while at the beach or upon leaving the beach.

It is a further object of this invention to provide a beach cart which converts into a comfortable beach chair.

Another object of this invention is to provide a means to securely fasten and transport a beach umbrella.

Another object of this invention is to provide a means to securely transport those items typically desired at the beach.

An additional object of this invention is to provide a light weight beach cart which may be folded up for convenient storage.

These and further objects of the invention will become apparent from the accompanying figures and detailed description.

DETAILED DESCRIPTION OF THE INVENTION

Figure 1:
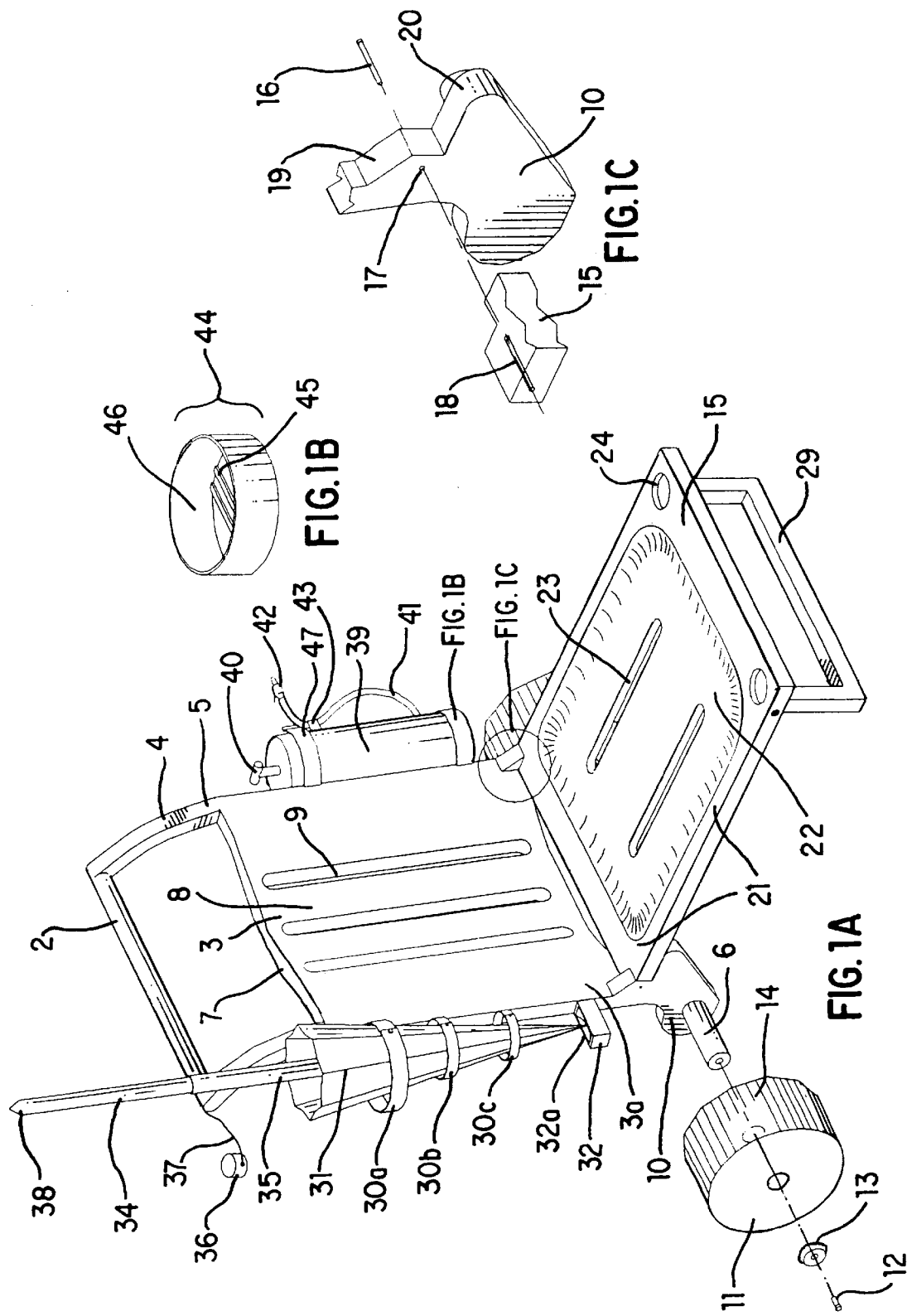
FIG. 1 shows a right frontal view the beach buddy with the seat/platform in its lowered position.

FIG. 1A shows the beach buddy 1 of this invention with its seat/platform 15 in an open lowered position as it would be used once unload at the beach. Beach buddy 1 has a substantially upright back 3. Attached to back 3 at its topmost end is a handle 2 by which the entire beach buddy 1 can be moved. Handle 2 is attached to two side members 4 extending from back 3 which are slightly curved rearward between their point of attachment 5 and handle 2. This curve of side members 4 displaces handle 2 slightly to rearward from the front of beach buddy 1 for more easy handling of the beach buddy. This displacement permits the user of the beach buddy to use his/her weight to push downward on handle 2 in order to more easily raise the front of seat/platform 15. A lever arm is formed by back 3 about the axles 6 to raise the front seat/platform 15 of the beach buddy when it is loaded.

Back 3 provides sufficient rigidity to maintain the structural integrity of beach buddy 1 when items are loaded onto seat/platform 15 during transport to the beach. In addition, back 3 is gently curved towards the rear as indicated at 7 to provide a contoured back surface 8 against which a person may rest when beach buddy 1 is used as a chair at the beach. Several holes or slots 9 extending through the thickness of back 3 provide ventilation in back 3 when beach buddy 1 is used as a chair.

At the lower end of back 3 opposite handle 2, extensions from both sides of back 3 form two base mounts 10 to which are attached axle shafts 6. Wheels 11 are mounted to axle shafts 6 by means of wheel fasteners 12 which pass through wheel caps 13 and screw into axle shafts 6. Wheels 11 are wide in order to spread the weight of the beach buddy 1 over a larger surface so that the wheels 11 do not dig down into soft sand as beach buddy 1 is wheeled onto the beach. The wheels 11 may have a slight grooving 14 across their outer surface which come into contact with the beach in order to better grip the beach sand so that the wheels 11 rotate rather than slide over the sand. By rotating, the friction of the wheels 11 with the sand is significantly reduced and less effort is required to pull or push beach buddy 1 over the beach. In an alternative embodiment, an axle (not shown) may extend through and between the two supporting axle shafts 6 so that the wheels 11 are directly fastened to the axle.

In the preferred embodiment, back 3, including handle 2, side members 4, base mounts 10, and axle shafts 6 are integrally molded out of a suitably strong lightweight structural plastic. A plastic material is preferred for several reasons. For the beach buddy to be easy to use, it should be light, strong, and impervious to salt water corrosion. In addition, maring or scratching of its surface by sand should have little effect either on its appearance or its functionality. Finally, it should be lightly colored so that it does not absorb too much heat while sitting out in the sun and cools quickly. Plastic materials meet all these requirements. In addition, plastic materials may be shaped or contoured into comfortable surfaces.

Figure 4:
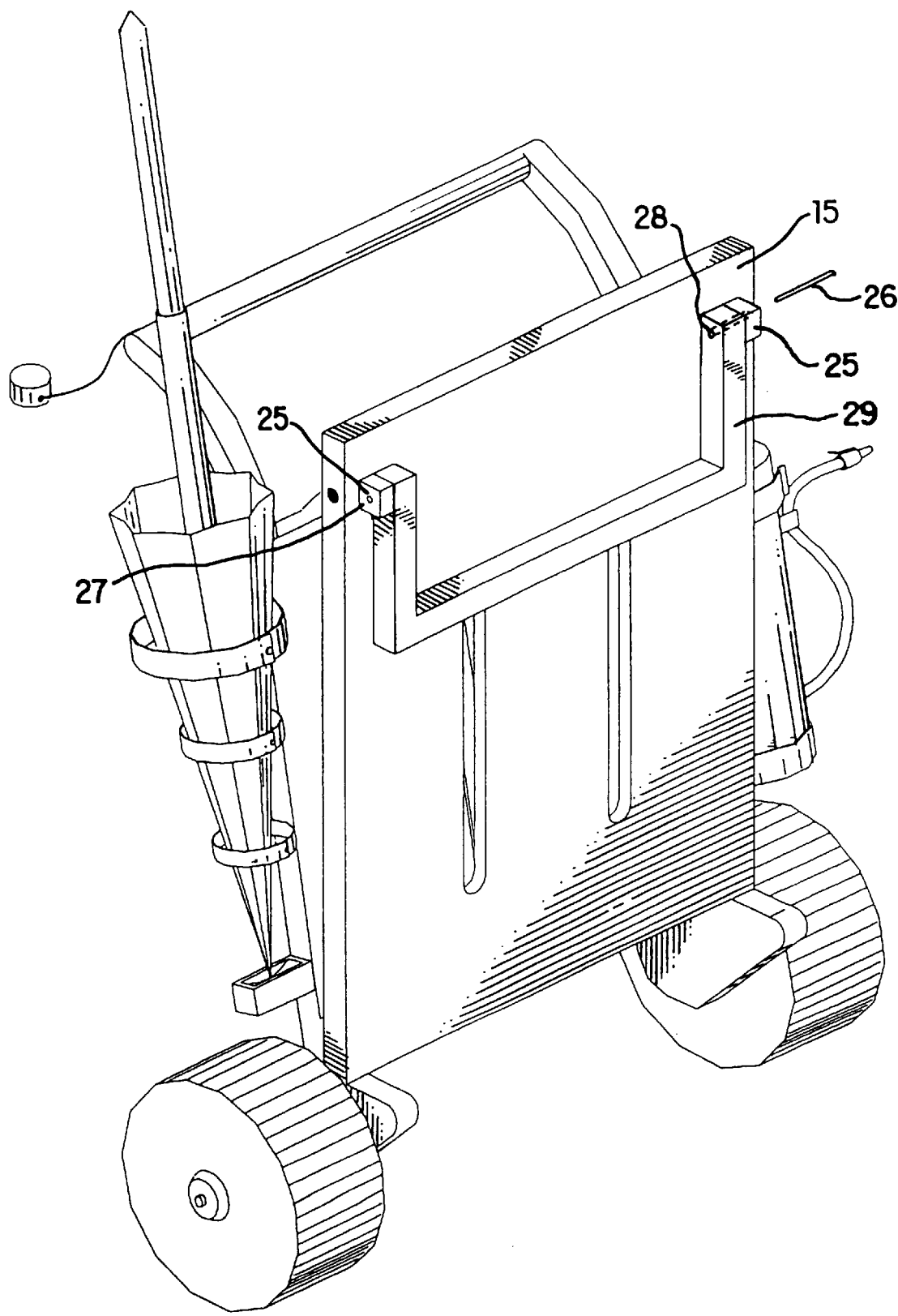
FIG. 4 shows the beach buddy folded for transport or storage.

As shown in FIG. 1C, a seat/platform 15 is rotatably attached to back 3 at base mounts 10 by hinge pins 16. Pins 16 have an outer diameter slightly less than the inner diameter of pivot holes 17 in base mounts 10 and fictionally engage holes 18 at the rear end of seat/platform 15. In the preferred embodiment, pins 16 are made of stainless steel. Base mounts 10 extend forward of the front surface 3a of back 3 so that pivot holes 17 lie in a plane forward of the front surface 3a of back 3. In addition, the top edges 19 of base mounts 10 are angled to that seat/platform 15 will clear base mounts 10 when it is rotated into its collapsed position. In this manner, a low friction pivot is provided so that seat/platform 15 may rotate between a collapsed position, which is substantially parallel to back 3 as shown in FIG. 4 to an open position substantially perpendicular to back 3 as shown in FIG. 1. Extension supports 20 extend forward from each base mount 10 to provide both a stop to further rotation of seat/platform 15 and a support for one end of seat/ platform 15 when seat platform 15 is rotated into a substantially perpendicular position to back 3 to form a chair.

Seat/platform 15 provides sufficient rigidity to maintain its structural integrity when weight, either of items to be transported or of a person, is placed upon it. The outer edge surfaces 21 of seat/platform 15 are coplanar and form a frame around an inner section 22 of seat/platform 15. Section 22 is gently curved downward from the coplanar edges 21 to form a contoured seat upon which a person may comfortably rest when the beach buddy is used as a beach chair. Holes or slots 23 extending through the thickness of seat/platform 15 provide ventilation and drainage. Cup openings 24 extending through the outer end of seat/platform 15 are appropriately sized to form holders for drinks. As shown in FIG. 4 a U-shaped support 29 is rotatably attached by pins 26 to two mounts 25 which are attached to each side of the bottom of seat/platform 15. Pins 26 have an outer diameter slightly less than the inner diameter of pivot holes 27 in mounts 25 and fictionally engage holes 28 in each arm of U-shaped support 29. In the preferred embodiment, pins 16 are made of stainless steel. In its extended position, U-shaped support 29 is at substantially a right angle to seat/platform 15 and is weight bearing. Support 29 is extended whenever weight is placed upon seat/platform 15 either from items to be carried or from a person using beach buddy 1 as a chair. When seat/platform 15 is in its collapsed position parallel to back 3, support 29 rotates so that it is parallel to seat/platform 15.

On one side of back 3 several umbrella restraining rings 30 (30a, 30b, 30c) are attached. A collapsed beach umbrella 31 may be inverted and placed through the rings 30. The diameters of each ring 30 are decreased slightly from top to bottom of back 3 so that each lower ring has a smaller diameter than the ring immediately above it. In this manner the typical taper of a collapsed umbrella 31 is approximated and umbrellas of varying maximum diameter can be securely held. Below the lowermost ring 30c an umbrella stop 32 is attached to back 3. A slight depression 32a in stop 32 is designed to receive the top end 33 of umbrella 31, to prevent umbrella 31 from sliding too far down and hitting wheel 11. In addition, the full weight of a heavy or damp umbrella 31 is not borne entirely by rings 30 but is also borne by stop 32.

As shown in FIG. 1, umbrella 31 has a collapsible pole one section 34 of which slides into another 35. A flexible umbrella pole cap 36 is attached by lanyard 37 to side member 4 and is used to seal the open end of umbrella pole 35. In this manner, the pointed end 38 of umbrella pole 34 does not extend towards the face of the person using beach buddy 1 and there is no possibility with cap 36 in place that pole section 34 will accidentally slide out of section 35 even when beach buddy 1 is tipped over so that back 3 rests on the sand.

On the side of back 3 opposite the umbrella rings 30, a pressurizable sprayer 39 is mounted. Sprayer 39 is similar to the type familiar to gardening enthusiasts. In the present invention it is intended that sprayer 39 be filled with fresh water before beach buddy 1 is taken to the beach. Sprayer 39 has a pressurizing pump driven by pump handle 40, an outlet hose 41, and a control valve and nozzle 42. Typically, the hose 41 is mounted to the side of sprayer 39 with a retaining clip 43. Sprayer 39 rests upon a sprayer support 44 which is fastened to back 3. As shown in FIG. 1B, sprayer support 44 has a base support 45 which bears the weight of sprayer 39 and a raised rim 46 which prevents sprayer 39 from slipping off of sprayer support 44. Support base 45 is designed to permit water to drain through it. Sprayer 39 is additionally attached to back 3 by clamping ring 47 which is mounted to back 3 so that it encircles sprayer 39 near its top end. In an alternative embodiment, not shown, the water containing body of sprayer 39 may be integrally molded into back 3. The weight of the sprayer 39, including its contained water, poses no problem of transport even over long distances to the beach, since the weight is borne by beach buddy 1.

Figure 2:
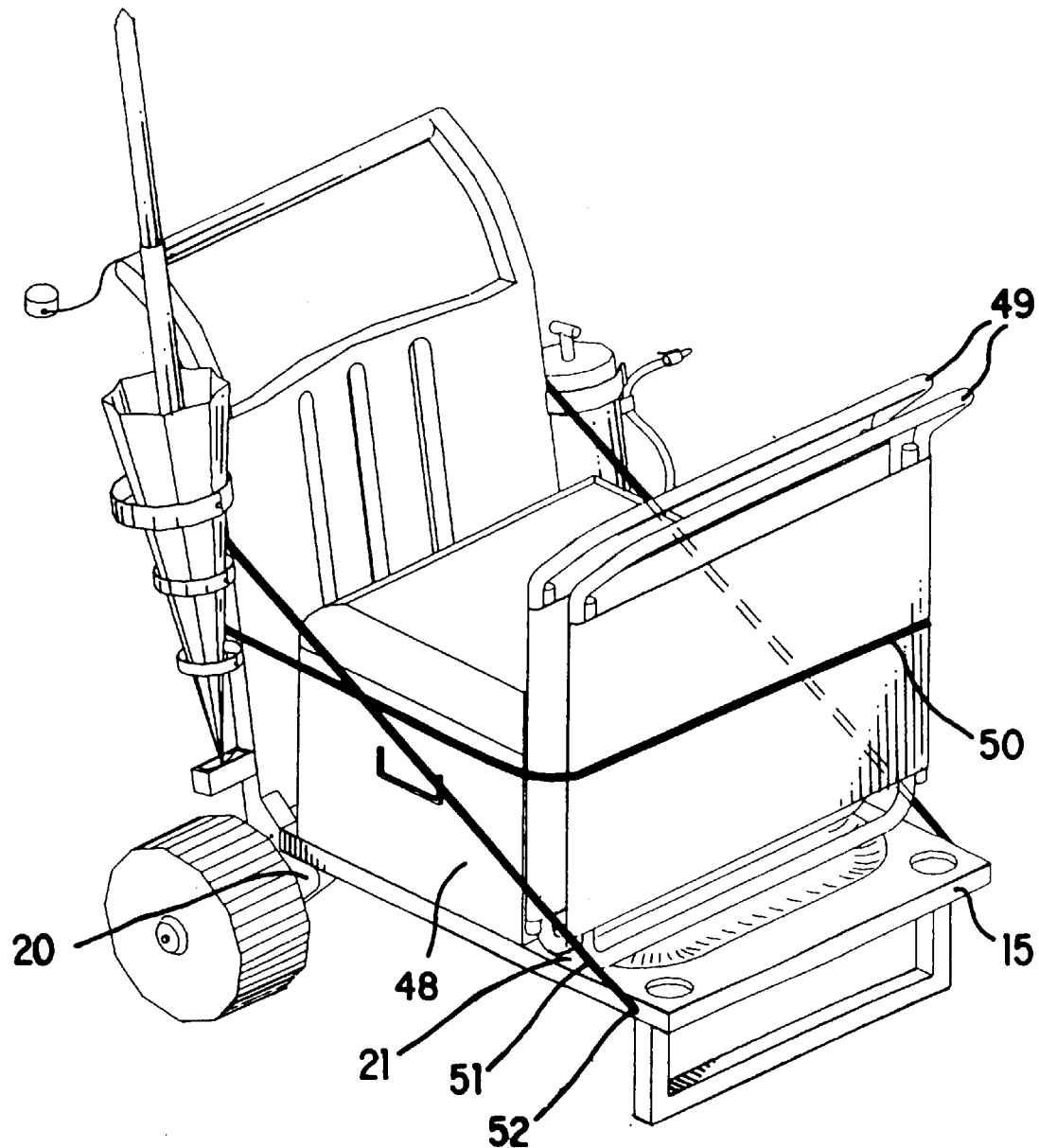
FIG. 2 shows the beach buddy loaded for carrying with a cooler and portable chairs.

FIG. 2 shows beach buddy 1 as it would be loaded for transport to the beach. Representative items such as a cooler 48 and beach chairs 49 are shown placed on seat/platform 15 so that they are supported on outer edges 21 of seat/platform 15. Seat/platform 15 is supported at one end by stops 20 and at the other end by support 29. If desired, seat and back cushions for the beach buddy may also be included. Items to be transported are secured to beach buddy 1 by means of a typical stretchable elastic cord 50 which encircles the items and the back 3 of beach buddy 1. In addition, to help support the weight placed on seat/platform 15, two flexible support straps 51 are removably attached on either side of seat/platform 15. Straps 51 removably fasten to back 3 and seat/platform 15 by means of fasteners 52 which are mounted towards the outer end of seat/platform 15 and the top end of back 3 so that, in use, straps 51 make an approximate 45 degree angle with back 3 and seat/platform 15. The length of straps 51 is such that the straps are fully extended when seat/platform 15 rests against extension support stops 20. Straps 51 are attached by fasteners 52 after loading seat/platform 15 for transport, and can be removed once the desired spot on a beach is reached. Typically, fasteners 52 may be heavy duty snap fasteners.

Figure 3:
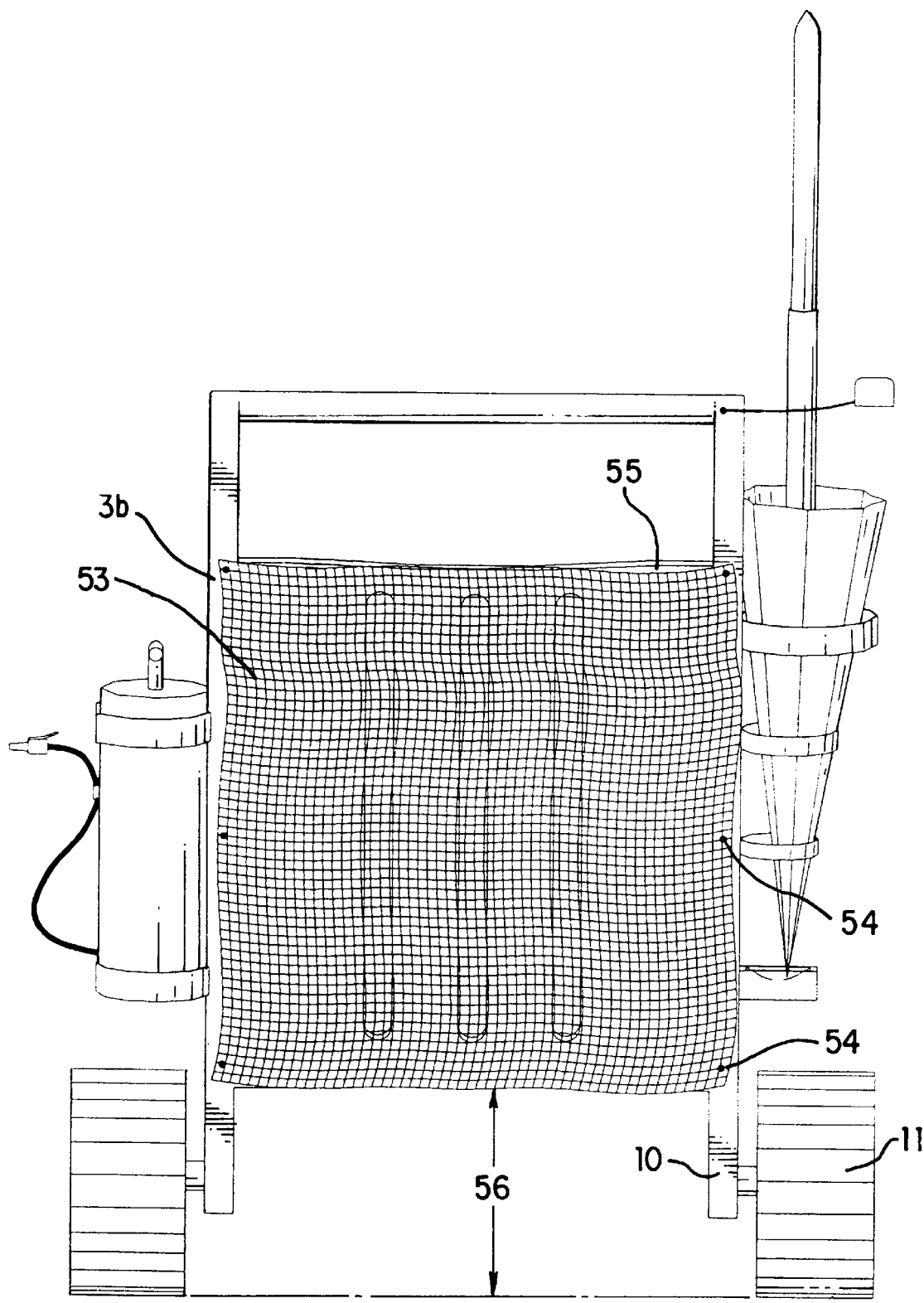
FIG. 3 shows a rear view of the beach buddy.

FIG. 3 is a rear view of beach buddy 1. For transport of miscellaneous beach items such as toys, suncream, towels, etc. a bag 53 is removably fastened to the rear surface 3b of back 3 with bag fasteners 54 such as snap fasteners. Bag 53 is open at its top 55 and, in the preferred embodiment is made of an open mesh fabric. FIG. 3 also clearly shows that in the design of beach buddy 1, the mounting of wheels 11 on extensions 10 provides a clearance 56 under beach buddy 1 so that the underside of seat/platform 15 may easily clear the uneven surface of sand typically encountered at the beach.

FIG. 4 shows beach buddy 1 in its collapsed position with seat/platform 5 folded up. In this configuration, beach buddy 1 is more easily stored in automobile trunks or carriers for transport to the beach. If necessary to fit into the automobile or carrier, beach umbrella 31 and sprayer 39 may be quickly and conveniently removed from beach buddy 1.

Typically, to use the beach buddy seat/platform 15 is first rotated to its perpendicular position with support 29 extended under it. A beach umbrella is secured in the umbrella rings 30 and the pole cap 36 is placed over the pole end. Sprayer 39 is filled up with fresh water. After loading and securing the items to be transported to the beach, the user applies downward force on back 3 to raise seat/platform 15. Both the straps 51 and supports 20 cooperate to raise the front of seat/platform 15. The wide wheels help distribute the weight of the loaded beach buddy as it is pushed over the sand of the beach. Once at the final beach destination, seat/platform 15 is lowered onto support 29, the beach buddy unloaded, and the umbrellas erected.

The usefulness of sprayer 39 in conjunction with the beach buddy can not be overstated since it provides many needed functions for cleansing both people and beach items. A few examples will illustrate the uses. For instance, it is frequently necessary to wash sand off of young children's faces before eating and/or after their sandwich bags have fallen into the sand. Usually cold drinking water from a cooler is used which is both too cold for the child and a waste of a precious beach commodity. Since sprayer 39 is exposed to the sun, the contained water is warmer and more appropriate for such washing jobs. In addition, the adjustable pressure spray is much better suited to quickly remove sand. Similarly, sprayer 39 provides a fresh water spray which may be used to cool a person down or to remove salt water (or scummy lake water) from an emerging bather. Additionally, any beach item which gets sticky and sandy is easily rinsed with a higher pressure spray from sprayer 39. As mentioned earlier, the pressurized fresh water from sprayer 39 can be used to remove sand from bathing suits, bodies, and feet when leaving the beach. This is particularly important for both comfort and safety when putting on shoes either to walk away from the beach area or to drive a car. Clearly, the uses of the beach buddy sprayer 39 are as numerous as the sandy problems encountered by beach goers.

By providing a single transport system for use by one person which can carry all the items typically taken to the beach including, but not limited to, such items as coolers, chairs, towels, toys, umbrellas, radios, and protective lotions, the present invention permits greater attention to be paid by the user to other persons, including the monitoring and direction of young children.

What is claimed is:

1. A cart for transporting to a beach those items typically found useful for fuller enjoyment of the beach, which cart can further be used as a beach chair comprising:
   a. a back;
   b. a seat/platform;
   c. means for rotatably fastening the seat/platform to the back;
   d. means for supporting the end of the seat/platform which is rotatably fastened to the back;
   e. means for supporting the seat/platform when carrying items to the beach;
   f. means for supporting the seat/platform at its outer end;
   g. means for securing an umbrella to the back for transport;
   h. at least two wheels adapted for use on sand;
   i. means for rotatably fastening the wheels to the back;
   j. an air pump pressurizable water sprayer; and
   k. means for securing the water sprayer to the back
whereby items may be transported to the beach on said cart and, once unloaded, the cart may be used as a beach chair.

2. The cart of claim 1 wherein the back is gently curved to provide a contoured back against which a person may lean when using the cart as a beach chair.

3. The cart of claim 1 wherein the center section of the seat/platform is gently curved to provide a contoured seat upon which a person may rest when using the cart as a beach chair.

4. The cart of claim 1 further comprising a miscellaneous item bag which is fastened to the rear surface of the back.

5. The cart of claim 1 wherein the back is integrally formed from one piece of a plastic material.

6. The cart of claim 1 wherein the seat/platform is integrally formed from one piece of a plastic material.

7. A cart for transporting items to a beach and for providing comfort at a beach comprising:
   a. a back;
   b. a seat/platform;
   c. means for rotatably fastening the seat/platform to the back;
   d. means for supporting the end of the seat/platform which is rotatably fastened to the back;
   e. means for supporting the seat/platform when carrying items to the beach;
   f. means for supporting the seat/platform at its outer end;
   g. means for securing an umbrella to the back for transport;
   h. wheel means adapted for sand for rolling the cart to the beach;
   i. means for rotatably fastening the wheel means to the back;
   j. means for containing water;
   k. means for fastening to said back said means for containing water; and
   l. means for pressurizing and spraying said water
whereby items may be transported to the beach on said cart and, once unloaded, said cart may be used as a beach chair.

8. The cart of claim 7 wherein the back is gently curved to provide a contoured back against which a person may lean when using the cart as a beach chair.

9. The cart of claim 7 wherein the center section of the seat/platform is gently curved to provide a contoured seat upon which a person may rest when using the cart as a beach chair.

10. The cart of claim 7 further comprising a miscellaneous item bag which is fastened to the rear surface of the back.

11. The cart of claim 7 wherein the back is integrally formed from one piece of a plastic material.

12. The cart of claim 7 wherein the seat/platform is integrally formed from one piece of a plastic material.

13. A cart for transporting to a beach those items typically found useful for fuller enjoyment of the beach, which cart can further be used as a beach chair comprising in combination:
   a. a back;
   b. a seat/platform;
   c. means for rotatably fastening the seat/platform to the back;
   d. support means for supporting the end of the seat/platform which is rotatably fastened to the back;
   e. means for supporting the seat/platform when carrying items to the beach;
   f. means for supporting the seat/platform at its outer end;
   g. means for securing an umbrella to the back for transport;
   h. at least two wheels adapted for use on sand;
   i. means for rotatably fastening the wheels to the back;
   j. an air pump pressurizable water sprayer; and
   k. means for securing the water sprayer to the back
whereby items may be transported to the beach on said cart and, once unloaded, the cart may be used as a beach chair.

14. The cart of claim 13 wherein the back is gently curved to provide a contoured back against which a person may lean when using the cart as a beach chair.

15. The cart of claim 13 wherein the center section of the seat/platform is gently curved to provide a contoured seat upon which a person may rest when using the cart as a beach chair.

16. The cart of claim 13 further comprising a miscellaneous item bag which is fastened to the rear surface of the back.

17. The cart of claim 13 wherein the back is integrally formed from one piece of a plastic material.

18. The cart of claim 13 wherein the seat/platform is integrally formed from one piece of a plastic material.

* * * * *